(12) United States Patent
Kowalkowski et al.

(10) Patent No.: US 9,328,639 B2
(45) Date of Patent: May 3, 2016

(54) REGENERATION SYSTEM TO REGENERATE A PARTICULATE FILTER BASED ON CODE CLEAR DIAGNOSTIC SIGNAL

(71) Applicant: GM Global Technology Operations LLC, Detroit, MI (US)

(72) Inventors: Janean E. Kowalkowski, Northville, MI (US); Benjamin Radke, Waterford, MI (US); Vincent J. Tylutki, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 14/022,918

(22) Filed: Sep. 10, 2013

(65) Prior Publication Data

US 2015/0068193 A1 Mar. 12, 2015

(51) Int. Cl.
| | | |
|---|---|---|
| *F01N 3/00* | (2006.01) |
| *F01N 3/021* | (2006.01) |
| *F01N 9/00* | (2006.01) |
| *F01N 11/00* | (2006.01) |
| *F01N 3/025* | (2006.01) |
| *F01N 13/00* | (2010.01) |
| *F01N 3/20* | (2006.01) |

(52) U.S. Cl.
CPC .............. *F01N 3/021* (2013.01); *F01N 3/0253* (2013.01); *F01N 9/002* (2013.01); *F01N 11/00* (2013.01); *F01N 13/009* (2014.06); *F01N 3/2066* (2013.01); *F01N 2550/04* (2013.01); *F01N 2900/1606* (2013.01)

(58) Field of Classification Search
CPC F01N 9/002; F01N 11/002; F01N 1261/1493
USPC ....................... 60/295, 297, 301, 303
See application file for complete search history.

(56) References Cited

U.S. PATENT DOCUMENTS

| | | | |
|---|---|---|---|
| 2010/0058743 A1* | 3/2010 | Tsukada et al. ................. 60/287 |
| 2010/0089032 A1* | 4/2010 | Iwashita et al. ................. 60/274 |
| 2010/0139247 A1* | 6/2010 | Hiemstra et al. ................ 60/277 |
| 2010/0180577 A1* | 7/2010 | Gonze et al. .................... 60/277 |
| 2012/0110985 A1* | 5/2012 | McCombs et al. .............. 60/287 |
| 2013/0312389 A1* | 11/2013 | Yanakiev et al. ............... 60/274 |
| 2014/0352278 A1* | 12/2014 | Kowalkowski et al. ........ 60/274 |

* cited by examiner

*Primary Examiner* — Patrick Maines
(74) *Attorney, Agent, or Firm* — Cantor Colburn LLP

(57) ABSTRACT

An exhaust treatment system includes a particulate filter having a filter substrate configured to trap soot contained in exhaust gas. A regeneration system is configured to perform a regeneration operation that regenerates the particulate filter by burning away soot stored in the filter substrate. A control module is in electrical communication with the regeneration system to generate a first control signal that initiates the regeneration operation based on a comparison between at least one operating condition of the exhaust treatment system and a threshold value. The control module generates a second control signal in response to detecting at least one diagnostic signal. The second control signal initiates the regeneration operation independently of the comparison.

5 Claims, 3 Drawing Sheets

REGENERATION SYSTEM TO REGENERATE A PARTICULATE FILTER BASED ON CODE CLEAR DIAGNOSTIC SIGNAL

FIELD OF THE INVENTION

The subject invention relates to methods and systems for regenerating a particulate filter, and more particularly, to a system for regenerating a particulate filter based on a diagnostic control signal.

BACKGROUND

Exhaust gas emitted from an internal combustion engine is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Particulate filters remove particulate matter, such as soot, from the exhaust gas by trapping the particulate matter in a filter substrate. Over time, the capacity of the filter substrate is maximized such that the particulate filter must be regenerated using a regeneration system. The regeneration system performs a regeneration operation that increases heat realized by the particulate filter, thereby burning away the trapped particulate matter. Various state government regulations require the regeneration system to pass an emission inspection, which includes diagnosing whether the particulate filter is properly regenerated.

SUMMARY OF THE INVENTION

In at least one exemplary embodiment of the present disclosure, an exhaust treatment system includes a particulate filter having a filter substrate configured to trap soot contained in exhaust gas. A regeneration system is configured to perform a regeneration operation that regenerates the particulate filter by burning away soot stored in the filter substrate. A control module is in electrical communication with the regeneration system to generate a first control signal that initiates the regeneration operation based on a comparison between at least one operating condition of the exhaust treatment system and a threshold value. The control module generates a second control signal in response to detecting at least one diagnostic signal. The second control signal initiates the regeneration operation independently of the comparison.

In another exemplary embodiment of the present disclosure, a control module is configured to control operation of a regeneration system that regenerates a particulate filter. The control module comprises a soot module, a regeneration module, and a diagnostic module. The soot module is configured to determine a soot mass indicative of an amount of soot stored in the particulate filter. The regeneration module is configured to control operation of the regeneration system based on a comparison between at least one operating condition of the exhaust treatment system and a threshold value. The diagnostic module is configured to generate an over-ride control signal in response to detecting at least one diagnostic signal. The over-ride control signal commands the regeneration module to perform the regeneration operation independent of the comparison.

In yet another exemplary embodiment of the present disclosure, a method controls a regeneration system configured to perform a regeneration operation that regenerates a particulate filter in response to the occurrence of at least one operating condition. The method comprises detecting a diagnosis signal indicating a PASS event corresponding to a diagnosis operation, and generating an over-ride signal in response to detecting the diagnosis signal. The method includes performing a regeneration operation based on the over-ride signal regardless as the at least one operating condition occurs. The method further includes storing at least one bit in a memory device indicating completion of the regeneration operation.

The above features of exemplary embodiments of the present disclosure are readily apparent from the following detailed description of the invention when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
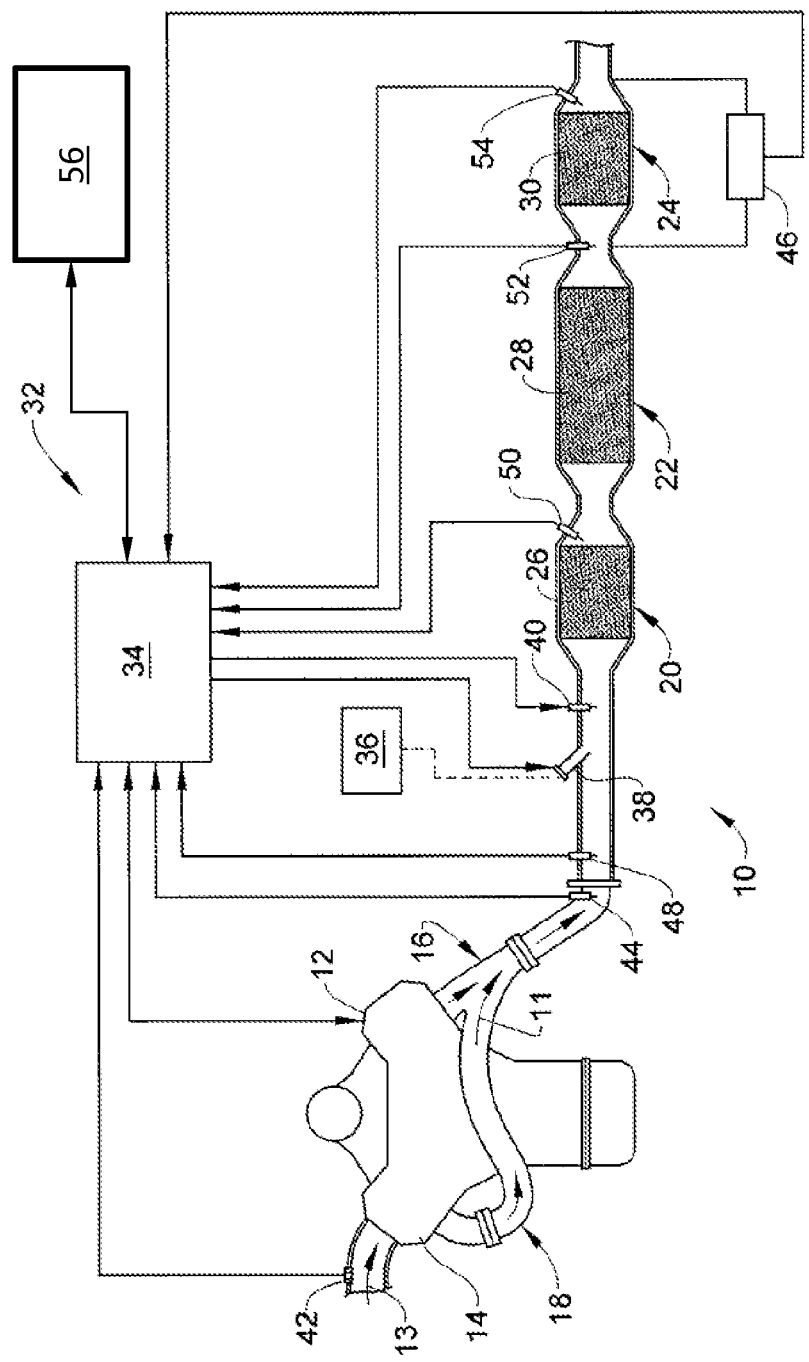
FIG. 1 is a schematic diagram of an exhaust gas treatment system including a regeneration system according to an exemplary embodiment.

The following description is merely exemplary in nature and is not intended to limit the present disclosure, its application or uses. It should be understood that throughout the drawings, corresponding reference numerals indicate like or corresponding parts and features.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality. In at least one embodiment of the present disclosure, a module may include a microcontroller as understood by those ordinarily skilled in the art.

Referring now to FIG. 1, exemplary embodiments of the present disclosure are directed to an exhaust gas treatment system 10 that reduces exhaust gas constituents existing in exhaust gas 11 generated by an internal combustion engine 12. It is appreciated that the exhaust treatment system 10 described herein may be utilized with various engine systems that may include, for example, but are not limited to, diesel engines, gasoline direct injection systems and homogeneous charge compression ignition engine systems.

Air 13 is drawn into cylinders 14 of the engine 12 and mixed with fuel. The air/fuel mixture is combusted therein and expelled through an exhaust system 16. As can be appreciated, the systems and methods of the present disclosure can be implemented in engines having a plurality of cylinders 14 including, but not limited to, 2, 3, 4, 5, 6, 8, 10 and 12 cylinders.

The exhaust gas treatment system 10 is in fluid communication with the exhaust system 16 to receive the exhaust gas 11. The exhaust gas treatment system 10 generally includes one or more exhaust conduits 18, and one or more exhaust treatment devices. In various embodiments, the exhaust treatment devices include an oxidation catalyst device (OC) 20, a selective catalytic reduction device (SCR) 22, and a particulate filter (PF) 24.

Still referring to FIG. 1, the exhaust conduit 18, which may comprise several segments, transports exhaust gas 11 from the engine 12 to the exhaust gas treatment devices. For example, the OC 20 receives exhaust gas 11 from the engine 12. As can be appreciated, the OC 20 can be of various flow-through, oxidation catalysts known in the art. In various embodiments the OC 20 may include a flow-through metal or ceramic monolith OC substrate 26 that is packaged in a rigid shell or canister having an inlet and an outlet in fluid communication with the exhaust conduit 18. The OC substrate 26 can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 20 treats unburned gaseous and non-volatile HC and CO, which are oxidized to form carbon dioxide and water. The OC 20 may also generate $NO_2$ to assist in converting $NO_x$ via the SCR 22 as discussed in greater detail. Further, the OC 22 may generate an exothermic event (e.g., a temperature increase) to heat the exhaust gas 11 to a regeneration temperature that regenerates the PF 24, as discussed in greater detail below.

The SCR 22 may be disposed downstream of the OC 20, and is configured to reduce $NO_x$ constituents in the exhaust gas 11. In at least one embodiment, the SCR 22 may also be configured to filter the exhaust gas 11 of carbon and other particulate matter. As can be appreciated, the SCR 22 may be constructed of various materials known in the art. In various embodiments, for example, the SCR 22 may be constructed using a wall flow monolith SCR filter 28, such as, for example, wound or packed fiber filters, open cell foams, sintered metal fibers, etc. In various embodiments, the SCR 22 includes an SCR catalyst composition (e.g., a SCR washcoat) applied to the SCR filter 28. The SCR 22 may utilize a reductant, such as ammonia ($NH_3$) to reduce the $NO_x$. More specifically, the SCR 22 catalyst composition can contain a zeolite and one or more base metal components such as iron (Fe), cobalt (Co), copper (Cu) or vanadium (V) which can operate efficiently to convert NO constituents in the exhaust gas 11 in the presence of $NH_3$. The reductant utilized by the SCR 22 may be in the form of a gas, a liquid, or an aqueous urea solution and may be mixed with air 13 to aid in the dispersion of an injected spray generated by a reductant supply system as known to those ordinarily skilled in the art.

The PF 24 may be disposed downstream of the SCR 22. Likewise, the PF 24 receives the exhaust gas 11 from the engine 12. The PF 24 includes a filter substrate 30 configured to filter the exhaust gas 11 of carbon and other particulate matter (e.g., soot). As can be appreciated, the PF 24 can be of various particulate filters known in the art. In various embodiments, the PF 24 may be constructed using a wall flow monolith filter substrate 30 or other devices, such as, for example, wound or packed fiber filters, open cell foams, sintered metal fibers, etc. Trapped particulate matter (i.e., soot stored in the filter substrate 30) is removed from the PF 24 through one or more regeneration operations known to those ordinarily skilled in the art. In at least one embodiment, the PF 25 may be regenerated using an active regeneration operation as discussed in greater detail below.

The exhaust treatment system further includes a regeneration system 32 disposed upstream from the OC 20. The regeneration system 32 includes a fuel supply 36, an injector 38, and an igniter 40. The fuel supply 36 stores fuel (e.g., hydrocarbon fuel). In another embodiment, the igniter 40 may be removed, and the engine 12 may be controlled to increase the temperature of the exhaust gas 11. The increased exhaust gas temperatures reaches a PF combustion temperature that initiates combustion of the particulate matter and soot stored in the PF 24, as understood by those ordinarily skilled in the art.

In at least on exemplary embodiment, a control module 34 is in electrical communication with the injector 38 and the igniter 40. The control module 34 controls the injector 38 to inject an amount of fuel into the exhaust gas 11 and to control the timing of the igniter 40 to ignite the fuel. In response to igniting the fuel, the hydrocarbon fuel mixed with the exhaust gas 11 is oxidized in the OC 20 causing an exothermic reaction that raises the temperature of the exhaust gas 11. The heated exhaust gas 11 travels downstream to the PF 24, which heats the filter substrate 30. The increased heat causes the soot stored in the filter substrate 30 to ignite and burn as the exhaust gas 11 passes through the PF 24, thereby regenerating the PF 24.

The control module 34 may control the regeneration system 32 based on one or more operating conditions and/or data models. For example, the regeneration system 32 may determine a traveling distance of a vehicle, and initiate the regeneration operation when the vehicle travels a predetermined distance. In another embodiment, the control module 34 may measure an amount of particulate matter (e.g., soot mass) stored in the PF 24 and may initiate the regeneration operation when the soot mass exceeds a threshold. In another embodiment, the regeneration may be initiated based on time (e.g., operating time of the engine 12) and/or fuel injection (e.g., the amount of fuel injected in one or more of the cylinders 14), as discussed in greater detail below.

The operating conditions may be measured by one or more sensors. Referring to FIG. 1, the exhaust gas treatment system 10 may include a mass air flow (MAF) sensor 42 and a $NO_x$ sensor 44. The MAF sensor 42 determines an intake air mass ($m_{Air}$) of the engine 10. In one embodiment, the MAF sensor 42 may include either a vane meter or a hot wire type intake mass air flow sensor. However, it is appreciated that other types of sensors may be used as well. The $NO_x$ sensor 44 is disposed upstream from the OC 20 and determines an amount of $NO_x$ (e.g. $NOx_{MASS}$) present in the exhaust gas 18 and/or a $NO_x$ flow rate (e.g., $NO_{xRATE}$).

The exhaust gas treatment system 10 may further include at least one pressure sensor 46 (e.g., a delta pressure sensor), as illustrated in FIG. 1. The delta pressure sensor 46 may determine the pressure differential (i.e., $\Delta p$) between an inlet and an outlet of the PF 24. Although a single delta pressure sensor 46 is illustrated, it is appreciated that a plurality of pressure sensors may be used to determine the pressure differential of the PF 24 as known to those ordinarily skilled in the art.

In addition to various pressure sensors, the exhaust gas treatment system 10 may include one or more temperature sensors. According to at least one exemplary embodiment of the present disclosure illustrated in FIG. 1, the exhaust gas treatment system 10 may include temperature sensors 48-54. The number of temperature sensors illustrated in FIG. 1, however, is not limited thereto. A first temperature sensor 48 is disposed upstream from the injector 38 to determine the temperature of the exhaust gas 11 entering the exhaust gas treatment system 10. A second temperature sensor 50 is disposed at an outlet of the OC 20 to determine an OC outlet temperature. A third temperature sensor 52 is interposed between the SCR 22 and the PF 24, and a fourth temperature sensor 54 is disposed at the outlet of the PF 24. The second temperature sensor 50 and the third temperature sensor 52 may determine the temperature of the SCR 22. The third temperatures sensor 52 and the fourth temperature sensor 54 may determine the temperature of the PF 24 as known to those ordinarily skilled in the art.

In at least one exemplary embodiment of the disclosure, the regeneration system 32 may electrically communicate with an externally connected diagnostic module 56, which outputs one or more diagnostic control signals. In response to receiving the diagnostic control signal, the control module 34 may initiate the regeneration operation discussed above. In at least one embodiment, the regeneration system 32 may over-ride one or more regeneration conditions that control the regeneration operation. That is, the control module 34 may initiate the regeneration operation in response to the diagnostic control signal, regardless of one or more regeneration conditions. The regeneration conditions include, but are not limited to, engine operating time, driving distance, soot mass, and regeneration frequency, any of which initiate the regeneration operation. The regeneration frequency condition is based on a regeneration history of the PF 24. For example, the regeneration frequency may be based on a comparison between number of executed regeneration operations and a frequency threshold. Therefore, the over-ride signal may initiate a regeneration operation regardless of the number of times the PF 24 has been previously regenerated.

Figure 2:
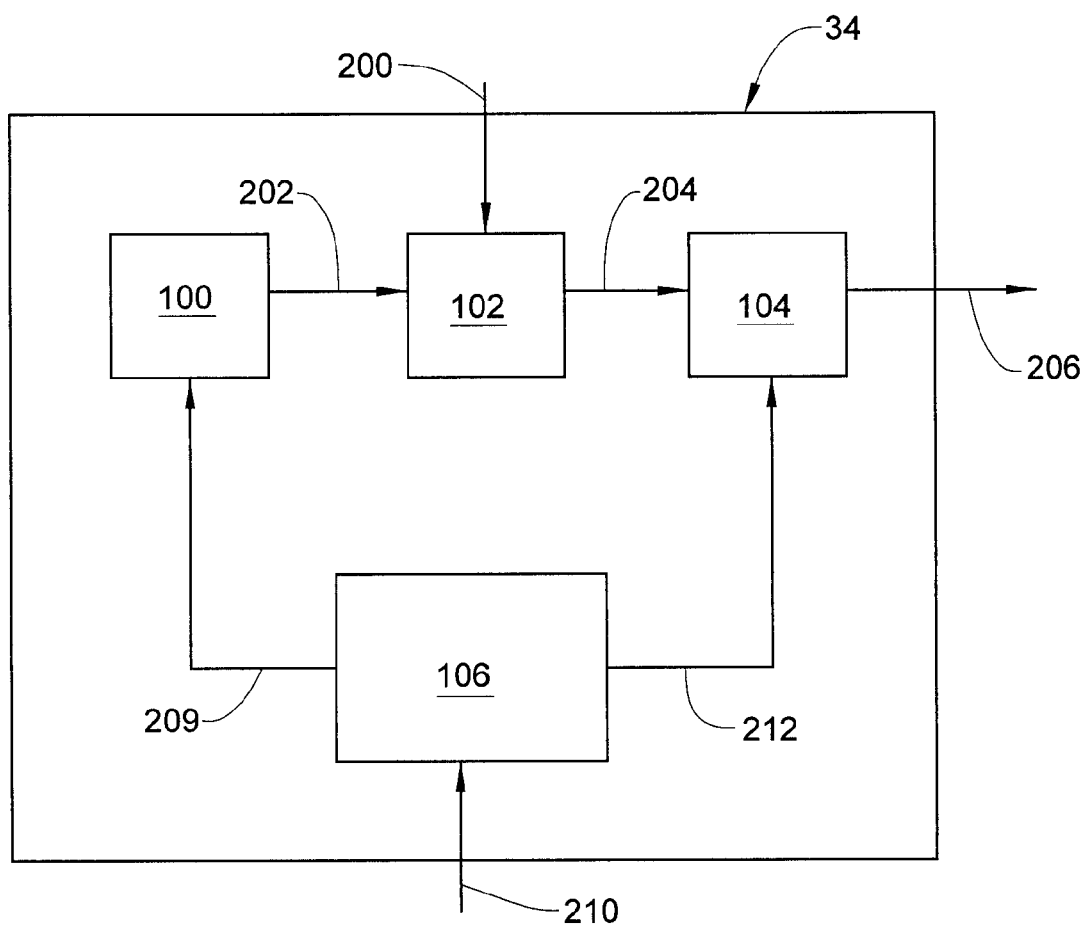
FIG. 2 is a block diagram illustrating a control module configured to control a regeneration system according to an exemplary embodiment.

Referring now to FIG. 2, a block diagram illustrates various sub-modules that may be embedded within the control module 34. Various embodiments of the control module 34 according to the present disclosure may include any number of sub-modules embedded therein. As can be appreciated, the sub-modules shown in FIG. 2 may be combined and/or further partitioned to similarly control the regeneration of the PF 24. Inputs to the control module 34 may be sensed from the engine 12, received from other control modules (not shown), and/or determined/modeled by other sub-modules within the control module 34.

The control module 34 includes a memory 100, a soot module 102, a regeneration module 104, and a vehicle diagnostic module 106. Each of the modules 102-106 interfaces and electrically communicates with the memory 100 to retrieve and update stored values and/or models as needed.

The memory 100 may store vehicle data including, but not limited to, one or more threshold values, time periods over which the temperatures were measured a number of configurable limits, maps, data values, variables, and system models. The memory 100 may also store completed results of inspection and maintenance (I/M) tests (e.g., diagnostic results) performed according to one or more diagnostic operations, such as various on-board diagnostic (OBD) operations well known to those of ordinary skill in the art.

In addition, the memory 100 includes at least one data field corresponding to a particular diagnostic operation. The data field stores at least one bit indicating a PASS event of the corresponding diagnostic operation. For example, the control module 34 may receive a code clear signal indicating that one or more diagnostic operations have been performed. In response to the code clear signal, the control module 34 may store at least one bit (i.e. a bit code) in the data field corresponding to the respective diagnosis operation indicating a result of the diagnostic. For example, a first bit code may indicate a PASS event, while a second bit code may indicate a FAIL event. During vehicle emission inspections, the memory 100 may be analyzed by an externally connected diagnostic device 56 to determine the result of the diagnostic based on the bits stored in the data fields.

The soot module 102 determines an amount of soot (i.e., soot mass) trapped in the filter substrate 30, and outputs a soot mass signal 204 indicating the soot mass. In at least one exemplary embodiment, the soot module 102 may receive one or more operating signals 200 output by one or more vehicle sensors. The soot module 102 may also receive one or more soot data signals 202 output from the memory 100. The operating signals 200 may indicate various operating measurements including, but not limited to, $\Delta p$, Ts, $NO_{xRATE}$, and $m_{Air}$. The Ts may be determined using one or more temperature signals output from the third temperature sensor 52 and/or the fourth temperature sensor 54. The $NO_{xRATE}$ is determined using a $NO_x$ signal output from the $NO_x$ sensor 44. The $m_{Air}$ may be output from the MAF sensor 42, and may be used to determine an exhaust gas volume flow rate (dvol) as known to those ordinarily skilled in the art. The soot data signal 202 may include, but is not limited to, a soot mass model. In another embodiment, the soot mass model may be stored in a separate memory included in the soot module 102. The soot module 102 determines the soot mass based on $\Delta p$, Ts, $NO_{xRATE}$, and the exhaust gas volume flow rate. Accordingly, the soot module 102 outputs the soot mass signal 204 indicating the soot mass of the PF 24.

The regeneration module 104 controls operation of the regeneration system 32 based on the soot mass indicated by the soot mass signal 204. More specifically, the regeneration module 104 compares the soot mass to a soot threshold ($TH_{SOOT}$). The $TH_{SOOT}$ may be stored in the regeneration module 104 or provided by another module including, but not limited to, the memory 100 and the soot module 102. If the soot mass exceeds $TH_{SOOT}$, the regeneration module 104 outputs one or more regeneration control signals 206 that control the injector 38 and the igniter 40 as discussed in detail above.

The vehicle diagnostic module 106 may receive one or more diagnostic signals 210 indicating the execution of a respective diagnostic operation, and monitors results of one or more I/M tests performed according to a respective diagnostic operation. The diagnostic operations include, but are not limited to, diagnosis of the OC 20, diagnosis of a temperature feedback control performed during the regeneration operation, diagnosis of the PF filtration efficiency, and diagnosis of the PF regeneration. After completing a diagnosis operation, the vehicle diagnostic module 106 may store I/M test results 209 in the memory 100.

In at least one embodiment, the diagnostic module 106 may receive a code clear diagnostic signal 210 of one or more respective diagnostic operations. The code clear diagnostic signal 210 may be output from an external serial data device 56 connected to the vehicle diagnostic module 106. The external serial data device may be operated by a diagnostic technician as known by those ordinarily skilled in the art. In response to receiving the code clear diagnostic signal 210, the vehicle diagnostic module 106 outputs an over-ride signal 212 that over-rides one or more regeneration conditions required to initiate a regeneration operation. In response to receiving the over-ride signal 212, the regeneration module 104 outputs the regeneration control signal 206 to control the injector 38. The regeneration module 104 may also output the over-ride signal 212 to an engine control module to control operation of the engine to increase the heat for igniting fuel injected by the injector 38. The regeneration module may also output the over-ride signal 212 to the igniter 40 to ignite the fuel injected by the injector 38. The over-ride signal 212 may initiate the regeneration operation independently of the comparison between the soot mass and THSOOT. Accordingly, a regeneration operation is preformed to regenerate the PF 24 each time a code clear diagnostic signal 210 is generated for indicating completion of one or more diagnostic operations.

As a result, the number of occurrences where regeneration of the PF 24 in not completed prior to a vehicle emission inspection may be reduced.

Figure 3:
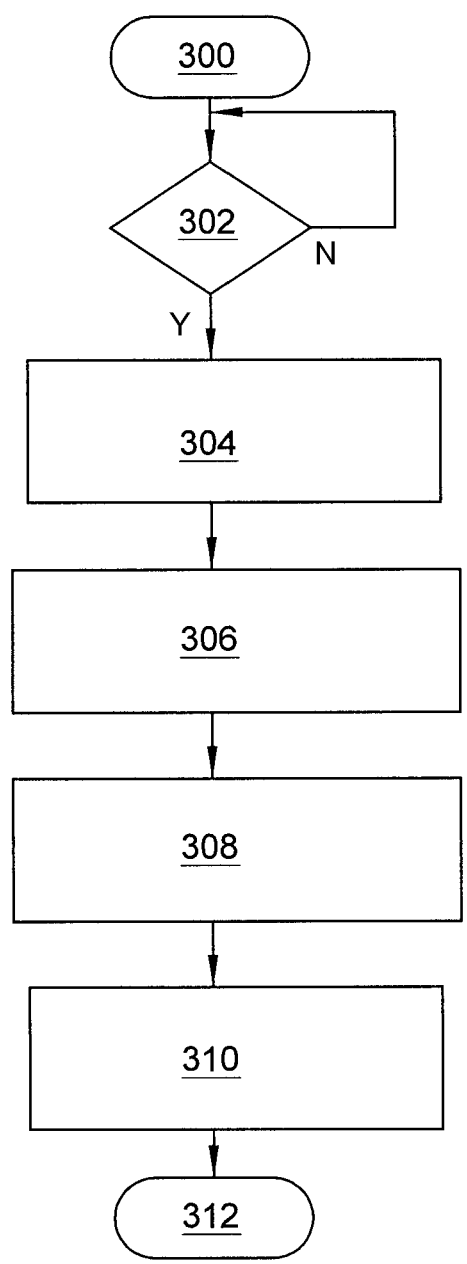
FIG. 3 is a flow diagram illustrating a method of controlling a regeneration system according to an exemplary embodiment.

Turning now to FIG. 3, a flow diagram illustrates a method of controlling a regeneration control system according to an exemplary embodiment. The method begins at operation 300. If a code clear diagnostic signal is not detected at operation 302, the method returns to operation 300 and continues monitoring for a code clear diagnostic signal. Otherwise, the method proceeds to operation 304 and over-rides one or more regeneration conditions for initializing a regeneration operation that regenerates the PF. The regeneration condition may include at least one operating condition (e.g., engine operating time, driving distance, fuel intake, soot mass) and/or a frequency of regenerating the PF. At operation 306, a regeneration operation to regenerate the PF is performed. One or more diagnostic operations are performed at operation 308. The diagnostic operations include, but are not limited to, diagnosing a temperature feedback control performed during the regeneration operation, diagnosing a filtration efficiency of the PF, and diagnosing effectiveness of the regeneration operation. At operation 310, at least one data bit is stored in memory 100 indicating completion of a respective regeneration operation. In at least one embodiment, the data bit indicates a successful PF regeneration. After storing the data bit, the method ends at operation 312.

While the present disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the invention not be limited to the particular embodiments disclosed, but that the invention will include all embodiments falling within the scope of the application.

What is claimed is:

1. An exhaust treatment system for treating exhaust gas output from an internal combustion engine, comprising:
a particulate filter including a filter substrate configured to trap soot contained in the exhaust gas;
a regeneration system configured to regenerate the particulate filter by burning away the soot stored in the filter substrate; and
a control module in electrical communication with the regeneration system, the control module including an electronic microcontroller having electronic memory that stores computer readable instructions that when executed by the microcontroller generates a first control signal that commands the regeneration system to perform a regeneration operation based on a comparison between at least one operating condition of the exhaust treatment system and a threshold value and to generate a second control signal in response to detecting at least one diagnostic signal output from a microcontroller of a remotely located electronic serial data diagnostic device electrically connected to the control module and configured to operate according to at least one command input by a manual operator located remotely from the control module, the second control signal initiating the regeneration operation independently of the comparison,
wherein the control module adjusts operation of the regeneration system to regenerate the particulate filter and burn away the soot stored on the filter substrate based on the second control signal.

2. The exhaust treatment system of claim 1, wherein the at least one diagnostic signal is a code clear signal indicating completion of at least one diagnostic operation.

3. The exhaust treatment system of claim 2, wherein the at least one operating condition includes an amount of the soot stored in the filter substrate.

4. The exhaust treatment system of claim 3, wherein the at least one diagnostic operation includes diagnosing a temperature feedback control performed during the regeneration operation, diagnosing a filtration efficiency of the particulate filter, and diagnosing an effectiveness of the regeneration operation.

5. The exhaust treatment system of claim 4, wherein the regeneration operation includes injecting fuel into the exhaust gas and igniting the fuel to increase a temperature of the exhaust gas such that the soot stored in the filter substrate combusts to regenerate the particulate filter.

* * * * *